Figure 7:
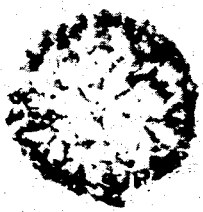

Sept. 27, 1966  D. C. HILTY ET AL  3,275,433
STEEL TREATING AGENT CONSISTING OF Ba-Ca-Al-Fe-Mn-Si
Filed Dec. 2, 1963  3 Sheets-Sheet 1
Fig.1.
Fig.2.
Fig.3.
Fig.4.
Fig.5.
Fig.6.
INVENTORS
STUART SOLOMON
WALTER CRAFTS
DONALD C. HILTY
BY
ATTORNEY Sept. 27, 1966  D. C. HILTY ET AL  3,275,433
STEEL TREATING AGENT CONSISTING OF Ba-Ca-Al-Fe-Mn-Si
Filed Dec. 2, 1963  3 Sheets-Sheet 2

INVENTORS
STUART SOLOMON
WALTER CRAFTS
DONALD C. HILTY
BY
ATTORNEY

Sept. 27, 1966     D. C. HILTY ET AL     3,275,433
STEEL TREATING AGENT CONSISTING OF Ba-Ca-Al-Fe-Mn-Si Filed Dec. 2, 1963                                3 Sheets-Sheet 3

INVENTORS
STUART SOLOMON
WALTER CRAFTS
DONALD C. HILTY
BY
ATTORNEY

United States Patent Office 3,275,433
Patented Sept. 27, 1966

3,275,433
STEEL TREATING AGENT CONSISTING OF
Ba-Ca-Al-Fe-Mn-Si
Donald C. Hilty, Sanborn, and Walter Crafts, Niagara Falls, N.Y., and Stuart Solomon, Summit, N.J., assignors to Union Carbide Corporation, a corporation of New York
Filed Dec. 2, 1963, Ser. No. 327,378
7 Claims. (Cl. 75—134)

This invention relates to an alloy addition agent for treating steels. More particularly, the present invention relates to an aluminum-containing deoxidizing and cleansing agent which retards the formation of residual inclusions in high quality steels.

There are certain applications of steels wherein a high degree of performance-reliability under severe conditions is required. One such application is in ball and roller bearings and in the bearing raceways. Such devices are made to such very close dimensional tolerances and operated under such high stress that what would otherwise be considered minor defects in the steel are rendered intolerable. A number of low alloy steel compositions have been developed in an effort to meet these rigid requirements and they are generally made by electric furnace processes under precise, carefully controlled conditions from high quality raw materials. The SAE 5000 series steels represent one of the type developed to meet these needs. Other such steels are those used for highly stressed aircraft structures. In the manufacture of these and other steels, aluminum is used as a de-oxidizer in order to aid in developing the desired properties.

However, the use of aluminum-containing deoxidation agents often results in the presence of inclusions in the finished steel. Segregated inclusions, especially those classified as galaxies are particularly deterimental to the steel in that they can be the focal point for initiation of failure, either during fabrication or service. Such galaxies are particularly associated with the oxides resulting from deoxidation of the steel with aluminum.

Heretofore, it has not been possible to ensure complete elimination of such undersirable galaxy type inclusions with the use of aluminum-containing addition agents. This has been unfortunate in view of the many advantages obtained using such addition agents.

It is therefore an object of this invention to provide an aluminum-bearing deoxidizing addition agent which will substantially avoid formation of galaxy type inclusions in steels.

Another object of the invention is to provide a deoxidizing addition agent capable of producing cleaner steels, i.e. steels of reduced inclusion content.

Other objects and advantages of the addition agent of the invention will be apparent from the following description and claims taken in conjunction with the photographs in the drawings which show typical inclusions which occur in steels treated with various deoxidizing agents.

The addition agent of the present invention is at least a quaternary alloy composition consisting essentially of aluminum, barium, calcium with the balance being at least one carrier metal selected from the group consisting of silicon, iron and manganese.

The compositional ranges for the present invention are about 7 to 21% barium, about 10 to 21% calcium with the aggregate of barium and calcium being from about 17 to about 40%; about 8 to 35% aluminum, up to 25% in the aggregate of iron and manganese, balance silicon.

Particularly effective ranges for aluminum, barium and calcium are as follows: Aluminum, 12–15%; barium, 10–12%; calcium, 18–20%.

In the manufacture of the SAE series steels for example, aircraft steels and other high quality steels, it is common practice to deoxidize the steels with aluminum and calcium-silicon. This treatment is effective up to a point, but it is found that as the initial oxygen and residual aluminum contents increase, the tendency to form harmful galaxy type inclusions is also markedly increased. As will be shown hereinafter, by using aluminum and calcium as components of the alloy addition agent in accordance with the present invention, the formation of such galaxies is greatly retarded and most often practically eliminated. Although the reason for the effect is not konwn, the aluminum, calcium and barium coact in the addition agent of the present invention to produce a result that cannot be obtained when the elements are used separately.

The effectiveness of the addition agent of the invention will be illustrated by examples based on treatment of SAE 52100 steel (nominal composition: 0.95–1.10% carbon; 0.25–0.45% manganese; 0.20–0.35% silicon; 1.30–1.60% chromium; 0.025% phosphorus maximum; 0.025% sulfur maxium), but this is not to be construed as limiting with respect to the types of steels that may be treated with the addition agent of this invention since other steels, e.g., AISI 3310, 4340, 1020, and the stainless steels can also be treated.

In the examples to be presented will be illustrated the treatment of steels having both low ($\sim$0.001%) and higher ($\sim$0.005%) oxygen and also both low ($\sim$0.02%) and higher ($\sim$0.05%) residual aluminum contents. For comparison, examples of steels treated with the composition of the invention as well as various other addition agents used alone and in mechanical mixtures will be given.

In order to present an accurate comparison between the various addition agents tested, a uniform test procedure was adopted which was based on preparing about 100 pounds of molten SAE 52100 grade steel, tapping successive 12-pound portions into preheated ladles wherein the addition agent under test was introduced during tapping and the so treated metal allowed to solidify in the ladle. Certain portions of the 100-pound heats were treated with commercial calcium-silicon to provide a basis of comparison.

The procedure followed in preparing each 100-pound heat of steel and in treating each portion thereof was to melt in an induction furnace, under an argon blanket, a 73-pound charge of electrolytic iron. When the iron was molten, part of the silicon and then part of the manganese, as manganese metal, was added. Approximately 23 pounds of a 4.5% carbon-iron, previously prepared by dissolving graphite in molten electrolytic iron, solidifying and crushing, was slowly added to the bath to introduce about 1.05% carbon. Blocking of the heat was completed by adding the remainder of the silicon (total 73 grams) and manganese (total 135 grams). Low-carbon ferrochrominum was then added (900 grams) followed by 17 grams, equivalent to 0.75 pound/ton, of aluminum as intermediate deoxidizer. The heat was held in the furnace for 2 minutes to homogenize the bath and adjust temperature of 1550° C.

Twelve pounds of the molten metal were subsequently tapped into a preheated ladle. During tapping, the addition agent under test was added to the stream of molten metal as it entered the ladle. The treated metal was allowed to solidify in the ladle to more nearly duplicate commercial cooling rates.

In all tests, the amount of addition agent added to each 12-pound portion of steel was that quantity which constituted an addition of about 0.15% silicon into the steel. The initial compositions of steels treated in each test are given in Table I and of the addition agents, in Table II. They will be referred to in the following disclosure by "Steel No." and by "Agent No."

The compositional range for alloy addition agents of the present invention used in the following tests is 7–21% barium, 10–21% calcium, the aggregate of barium and calcium being 20–35%; 8–16% aluminum, up to 10% in the aggregate of iron and manganese, balance silicon.

TABLE I.—INITIAL STEEL COMPOSITIONS

| Steel No. | Percent | | | | | | | |
|---|---|---|---|---|---|---|---|---|
| | C | Mn | P | S | Si | Cr | Al | $O_2$ |
| X-11 | 1.05 | 0.28 | 0.003 | 0.008 | 0.13 | 1.54 | 0.039 | 0.001 |
| X-12 | 1.05 | 0.29 | 0.003 | 0.010 | 0.15 | 1.54 | 0.037 | 0.002 |
| X-75 | 1.02 | 0.31 | 0.004 | 0.009 | 0.16 | 1.49 | 0.030 | 0.006 |
| X-76 | 1.03 | 0.31 | 0.004 | 0.010 | 0.16 | 1.52 | 0.028 | 0.005 |

TABLE II.—ALLOY ADDITION AGENT COMPOSITIONS OF THIS INVENTION

| Agent No. | Percent | | | | | | |
|---|---|---|---|---|---|---|---|
| | Al | Ba | Ca | Si | Ba+Ca | Mn | Fe |
| W-984 | 10.19 | 9.15 | 11.80 | 64.72 | 20.95 | | Bal. |
| X-64 | 8.24 | 20.07 | 13.99 | 53.43 | 34.06 | | Bal. |
| X-65 | 16.00 | 8.77 | 20.40 | 50.73 | 29.17 | | Bal. |
| X-207 | 15.8 | 7.94 | 19.60 | 48.25 | 27.54 | 5.07 | Bal. |

OTHER ADDITION AGENTS

| | Al | Ba | Ca | Si | Ba+Ca | Mn | Fe |
|---|---|---|---|---|---|---|---|
| W-980 | 10.51 | | 20.80 | 64.24 | | | Bal. |
| X-66 | 12.06 | 11.44 | | 72.63 | | | Bal. |
| W-979 | | 9.80 | 17.84 | 67.82 | 27.64 | | Bal. |
| 37157 | 1.92 | | 21.28 | 70.02 | | | 4.24 |
| 88660 | 0.99 | | 32.70 | 61.80 | | | 1.60 |
| 37137 | | 44.02 | | 51.78 | | | 1.65 |

All steels were examined after treatment by cutting a cross section from the ingot at a central position about one third the lengh from the bottom end. The sample area was polished for metallographic examination and the full polished area examined for the type and quantity of inclusions. Photographs were taken, at a magnification of 1000 times, of typical inclusions.

*Example I*

A 12-pound portion of molten steel No. X–11 was treated with commercial calcium-silicon Lot 88660 following the practice given above. The amount used was that required to add 0.15% silicon to the steel. After solidifying, cooling and sectioning, the sample so obtained was examined and found to contain small widely dispersed inclusions and no galaxies. Typical inclusions are illustrated in FIGURE 1. The treated steel contained 0.27% silicon and 0.025% aluminum.

A second 12-pound portion of the same steel, X–11, was treated with the addition agent of the invention, using the same procedure. The particular agent used was Number W–984. The treated steel contained 0.29% silicon and 0.048% aluminum, the latter element being present in almost twice the quantity found in the portion treated according to prior commercial practice. Metallographic examination of this portion of steel disclosed the presence of only a few dispersed inclusions similar to those found in the first portion. In spite of the much higher aluminum content, no galaxy type inclusions were present. Typical inclusions present are shown in FIGURE 2.

*Example II*

Four portions of steel X–76 were prepared in accordance with the previously described procedure. One portion was again treated with commercial calcium-silicon Lot 88660 in an amount such that 0.15% silicon was added to the steel. Metallographic examination of the treated steel showed the presence of numerous galaxies of varying size, several of which were "starburst" in appearance. A typical inclusion galaxy is shown in FIGURE 3. The treated steel contained 0.26% silicon and 0.01% aluminum. Steel X–76 contained much higher oxygen before treatment than was present in steel X–11 (0.005% versus 0.001%) and this nevertheless contributed to the formation of galaxies even though the aluminum content was lower than the correspondingly treated portion of steel X–11. This result particularly illustrates the problem that still exists in prior commercial operations and to the solution of which the present invention is directed.

Another 12-pound portion of the X–76 steel was treated in the same manner, with additional agent W–984 in accordance with the present invention. Examination of the final steel product disclosed the presence of only very small aggregations of inclusions such as are illustrated in FIGURE 4. The treated steel contained 0.28% silicon and 0.040% aluminum, twice the amount of aluminum contained in the previously mentioned calcium-silicon treated portion. In spite of the much higher aluminum content and the high initial oxygen content of the steel no fully developed galaxy type inclusions were present.

Two more portions of steel X–76 were treated with agents X–64 and X–65. The portion treated with agent X–64 analyzed 0.28% silicon and 0.037% aluminum, substantially the same as the portion treated with agent W–984. The finished steel which was treated with X–64 again contained a very few small aggregations of inclusions as shown in FIGURE 5.

The portion treated with agent X–65 contained 0.34% silicon and 0.076% aluminum. The higher aluminum content resulted from the higher aluminum content of the agent and the fact that a somewhat larger weight of agent was required because of the relatively low initial silicon content of the steel. The high aluminum, coupled with the high initial oxygen content of the X–76 steel did not produce the fully developed galaxies found in the portion treated with calcium-silicon. A few small clusters of inclusions were found as illustrated in FIGURE 6.

In order to further compare the agent of the invention with other deoxidizing agents, several other melts of steel were prepared and appropriate portions were treated as before but with a number of different agents as shown in the following examples.

*Example III*

A test was made with aluminum-calcium-silicon agent No. W–980 and a portion of low-oxygen steel X–12 following the same procedure as previously described.

The treated steel when finished contains 0.29% silicon and 0.048% aluminum. Metallographic examination disclosed the presence of numerous tight and starburst shaped galaxies such as shown in FIGURE 7.

*Example IV*

Three portions of steel X–75 were treated as before with standard calcium-silicon (Lot 88660), a medium-aluminum calcium-silicon (No. 37157) and commercial barium-silicon (No. 37137), respectively. The procedure followed was the same as that employed in the previous examples. As shown in Table I, the steel treated contained a relatively high percentage of oxygen being comparable to that of Example II.

Figure 8:

The portion treated with commercial calcium-silicon, Lot 88660, was found to contain occasional galaxies as shown in FIGURE 8. Analysis of the finished steel was 0.30% silicon and 0.019% aluminum, again being similar to the calcium-silicon treated portions of Example II.

Figure 9:

The portion treated with calcium-silicon agent No. 37157 containing a medium amount of aluminum showed 0.29% silicon and 0.017% aluminum in the finished steel. Metallographic examination disclosed the presence of a number of galaxies including "starburst" as shown in FIGURE 9.

Figure 10:

The third portion of the steel treated with commercial barium-silicon No. 37137 contained 0.24% silicon and 0.023% aluminum. Metallographic examination showed the steel to contain many galaxies as shown in FIGURE 10. This portion was of the poorest quality, with respect to inclusions, of the three portions prepared from steel X-75.

Example V

A test was made to determine if barium could be substituted for all of the calcium by treating a portion of steel X-76 with aluminum-barium-silicon agent No. X-66. The procedures followed were the same as in the previous examples.

Figure 11:

The finished steel analyzed 0.30% silicon and 0.063% aluminum. Metallographic examination showed the steel to be particularly dirty and to contain many small galaxies as illustrated in FIGURE 11. This agent was no more effective in suppressing galaxy formation than either of the aluminum-calcium-silicon agents tested in Example III and IV.

In order to illustrate that the three essential deoxidizing elements aluminum, barium, and calcium must be combined in a single alloy, the following examples are given, in which steel was treated with mechanical mixtures of addition agents simulating the agent of the invention.

Example VI

Figure 12:

A portion of the steel No. X-76 used in Examples II and V was treated with a mechanical mixture of barium-calcium-silicon agent No. W-979 with metallic aluminum in the ratio 3 parts of silicon as agent W-979 and 1 part of aluminum metal. This was compositionally equivalent to an agent containing 18.44% aluminum; 7.99% barium; 14.55% calcium and 55.31% silicon by weight. The addition introduced 0.15% silicon and 0.05% aluminum. The finished steel analyzed 0.36% silicon and 0.038% aluminum. Metallographic examination disclosed the presence of numerous small and several large galaxies. The treatment with the mixture did not produce a desirably clean steel. Typical galaxy type inclusions found are illustrated in FIGURE 12.

Example VII

Figure 13:

A portion of steel X-178 was treated with a mechanical mixture of calcium-aluminum-silicon agent No. W-980 and barium-silicon agent No. 37137, in the ratio of 3 to 1. With the mixture, 0.12% silicon was added by way of agent W-980 and 0.04% silicon by way of agent 37137. The equivalent gross composition of the mixture was 7.46% aluminum; 12.91% barium; 14.76% calcium; 60.77% silicon. The finished steel analyzed 1.10% carbon; 0.26% manganese; 0.006% phosphorus; 0.018% sulfur; 0.27% silicon; 1.37% chromium; 0.042% aluminum. Metallographic examination disclosed the presence of a number of galaxies, some of which were very large as shown in FIGURE 13.

Example VIII

Figure 14:

A further portion of steel X-178 was treated with a mechanical mixture of barium-aluminum-silicon and calcium-silicon addition agents Nos. X-66 and 88660, respectively. The mixture added 0.10% silicon by way of agent No. X-66 and 0.06% silicon by way of agent No. 88660. The gross composition of the mixture was 7.91% aluminum; 7.15% barium; 12.26% calcium; 68.57% silicon. The treated steel contained 0.055% aluminum and 0.33% silicon. Metallographic examination of the treated steel showed it to contain a large number of small galaxies. A typical galaxy is shown in FIGURE 14.

The following example is given to illustrate the use of manganese as a carrier element.

Example IX

A heat of No. X-214 steel was treated by adding 0.15% silicon as an aluminum-barium-calcium-silicon-manganese addition agent No. X-207. The composition of the treated steel was 1.12% carbon; 0.28% manganese; 0.005% phosphorus; 0.006% sulfur; 0.29% silicon; 1.65% chromium; 0.07% aluminum.

Figure 15:

The metallographic examination disclosed the presence of a very few small galaxies, comparable to the better results described above. One of the largest inclusion clusters is shown in FIGURE 15.

What is claimed is:

1. An aluminum-containing alloy addition agent consisting essentially of about 7% to 21% barium; about 10% to about 21% calcium, the aggregate of barium and calcium being from about 17% to about 40%; about 8% to about 35% aluminum, up to 25% in the aggregate of iron and manganese, balance silicon.

2. An aluminum-containing alloy addition agent consisting essentially of about 7% to 21% barium; about 10% to about 21% calcium, the aggregate of barium and calcium being from 20% to about 35%; about 8% to about 16% aluminum, up to 10% in the aggregate of iron and manganese, balance silicon.

3. An aluminum-containing alloy addition agent in accordance with claim 1 in which aluminum is in the range of 12% to 15%, barium is in the range of 10% to 12% and calcium is in the range of 18% to 20%.

4. An aluminum-containing alloy addition agent consisting essentially of about 10% aluminum; about 9% barium; about 12% calcium; about 65% silicon, balance iron.

5. An aluminum-containing alloy addition agent consisting essentially of about 8% aluminum; about 20% barium; 14% calcium; 53% silicon, balance iron.

6. An aluminum-containing alloy addition agent consisting essentially of about 16% aluminum; about 9% barium; 20% calcium; about 51% silicon, balance iron.

7. An aluminum-containing alloy addition agent consisting essentially of about 16% aluminum; about 8% barium; about 20% calcium; about 48% silicon; about 5% manganese, balance iron.

References Cited by the Examiner

UNITED STATES PATENTS

| 2,810,639 | 10/1957 | Kessler | 75—134 |
| 3,000,731 | 9/1961 | Atotani | 75—58 |
| 3,137,570 | 6/1964 | Mickelson | 75—124 |
| 3,215,525 | 11/1965 | Sprankle | 75—134 |

DAVID L. RECK, *Primary Examiner.*

R. DEAN, *Examiner.*